US012710769B2

(12) United States Patent
Yasuda et al.

(10) Patent No.: US 12,710,769 B2
(45) Date of Patent: Aug. 18, 2026

(54) DRONE-HUNTING DRONE, INFORMATION PROCESSING METHOD, AND SYSTEM

(71) Applicant: KABUSHIKI KAISHA TOSHIBA, Tokyo (JP)

(72) Inventors: Takeshi Yasuda, Yokohama Kanagawa (JP); Toshiaki Yoshida, Kawasaki Kanagawa (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 0 days.

(21) Appl. No.: 18/884,396

(22) Filed: Sep. 13, 2024

(65) Prior Publication Data

US 2025/0103062 A1 Mar. 27, 2025

(30) Foreign Application Priority Data

Sep. 26, 2023 (JP) ................................ 2023-163590

(51) Int. Cl.

| | |
|---|---|
| ***G05D 1/683*** | (2024.01) |
| ***A01M 29/16*** | (2011.01) |
| ***F41H 13/00*** | (2006.01) |
| *G05D 105/50* | (2024.01) |
| *G05D 109/20* | (2024.01) |
| *G05D 111/30* | (2024.01) |

(52) U.S. Cl.
CPC ............ *G05D 1/683* (2024.01); *A01M 29/16* (2013.01); *F41H 13/0006* (2013.01); *G05D 2105/50* (2024.01); *G05D 2109/20* (2024.01); *G05D 2111/30* (2024.01)

(58) Field of Classification Search
CPC .............. G05D 1/683; G05D 2105/50; G05D 2109/20; G05D 2111/30; G05D 2105/35; G05D 2109/254; G05D 1/225; A01M 29/16; F41H 13/0006; B64U 10/14; B64U 2101/00; B64U 2101/30; B64U 2201/20; B64U 10/13
See application file for complete search history.

(56) References Cited

U.S. PATENT DOCUMENTS

2020/0102075 A1* 4/2020 Goodrich .............. B64U 50/19
2023/0202690 A1 6/2023 Lerouge

FOREIGN PATENT DOCUMENTS

| | | | |
|---|---|---|---|
| CN | 110422330 | A | 11/2019 |
| CN | 215810473 | U | 2/2022 |
| JP | 2018-12477 | A | 1/2018 |
| JP | 2020-69833 | A | 5/2020 |
| JP | 2022-26749 | A | 2/2022 |
| JP | 7102239 | B2 | 7/2022 |
| WO | WO 2021/250332 | A1 | 12/2021 |

* cited by examiner

*Primary Examiner* — Yuen Wong
(74) *Attorney, Agent, or Firm* — Finnegan, Henderson, Farabow, Garrett & Dunner, LLP

(57) ABSTRACT

According to an embodiment, a hunting drone includes a hunting mechanism, a net gun, a flying mechanism, and a control unit. The hunting mechanism captures a target. The net gun generates a sound at the time of firing a hunting net. After approaching the target to a predetermined distance, the hunting drone captures the target using the hunting mechanism, while avoiding false recognition of the target by using the sound generated at the time of firing the net gun as a threatening sound to repel a wrong target such as a bird.

6 Claims, 4 Drawing Sheets

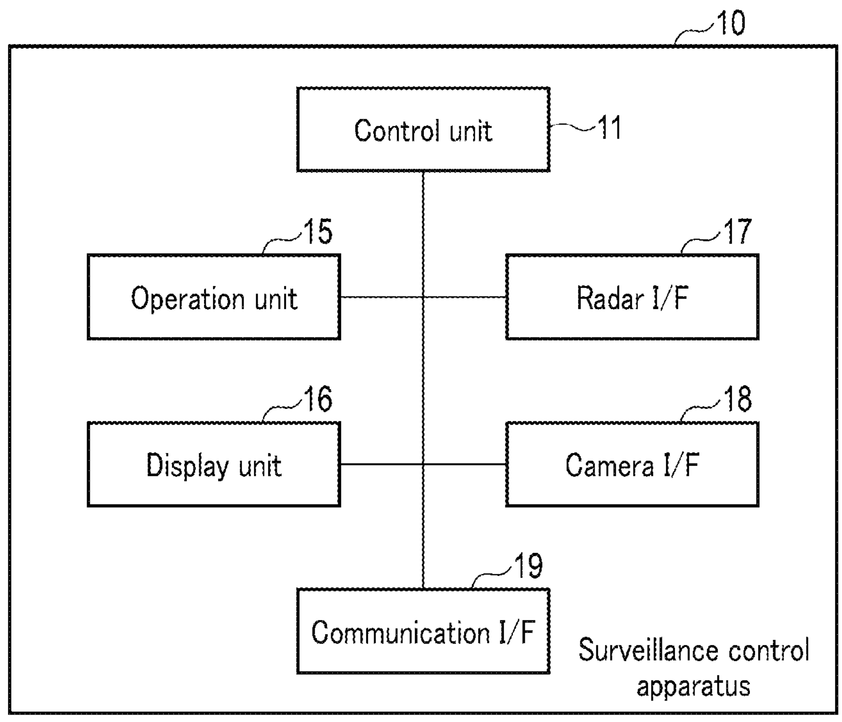
F I G. 2

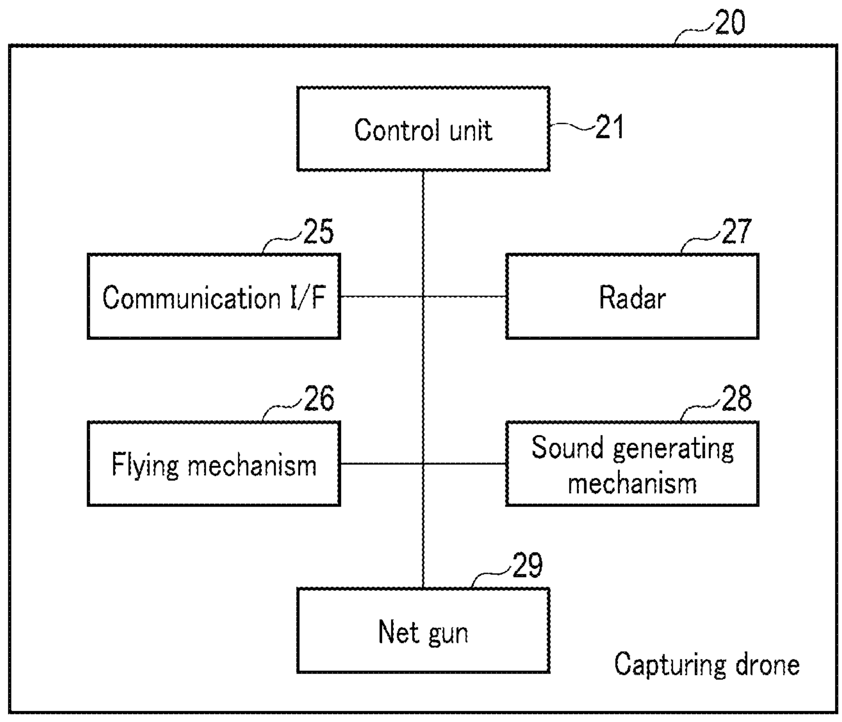
F I G. 3

DRONE-HUNTING DRONE, INFORMATION PROCESSING METHOD, AND SYSTEM

CROSS-REFERENCE TO RELATED APPLICATIONS

This application is based upon and claims the benefit of priority from Japanese Patent Application No. 2023-163590, filed Sep. 26, 2023, the entire contents of which are incorporated herein by reference.

FIELD

An embodiment of the present invention relates to a drone-hunting drone, an information processing method, and a system.

BACKGROUND

A system for capturing a suspicious flying object such as an illegal drone using a hunting drone has been provided. If a suspicious flying object is detected as a target, such a system causes the hunting drone to approach the target and to capture the target with a hunting net fired from a net gun.

There may be birds flying around the target. Conventionally, a bird flying around the target is falsely recognized as the target in such a system.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing a configuration example of a surveillance control apparatus according to the embodiment.

FIG. 3 is a block diagram showing a configuration example of a drone according to the embodiment.

DETAILED DESCRIPTION

According to an embodiment, a hunting drone includes a hunting mechanism, a net gun, a flying mechanism, and a control unit. The hunting mechanism captures a target. The net gun generates a sound at the time of firing a hunting net. After approaching the target to a predetermined distance, the hunting drone captures the target using the hunting mechanism, while avoiding false recognition of the target by using the sound generated at the time of firing the net gun as a threatening sound to repel a wrong target such as a bird.

Hereinafter, an embodiment will be described with reference to the accompanying drawings.

In a surveillance system according to the embodiment, a suspicious flying object that has entered a predetermined region (surveillance region) is captured. The surveillance system detects a suspicious flying object as a target using radar, etc. The surveillance system notifies the hunting drone of the target. After approaching the target, the hunting drone shoots the target with a net gun. The hunting drone carries the target captured by the net gun to a predetermined place.

Examples of the suspicious flying object include an illegal drone. It is assumed that the surveillance system is used in a place that needs security, such as an airport.

Figure 1:
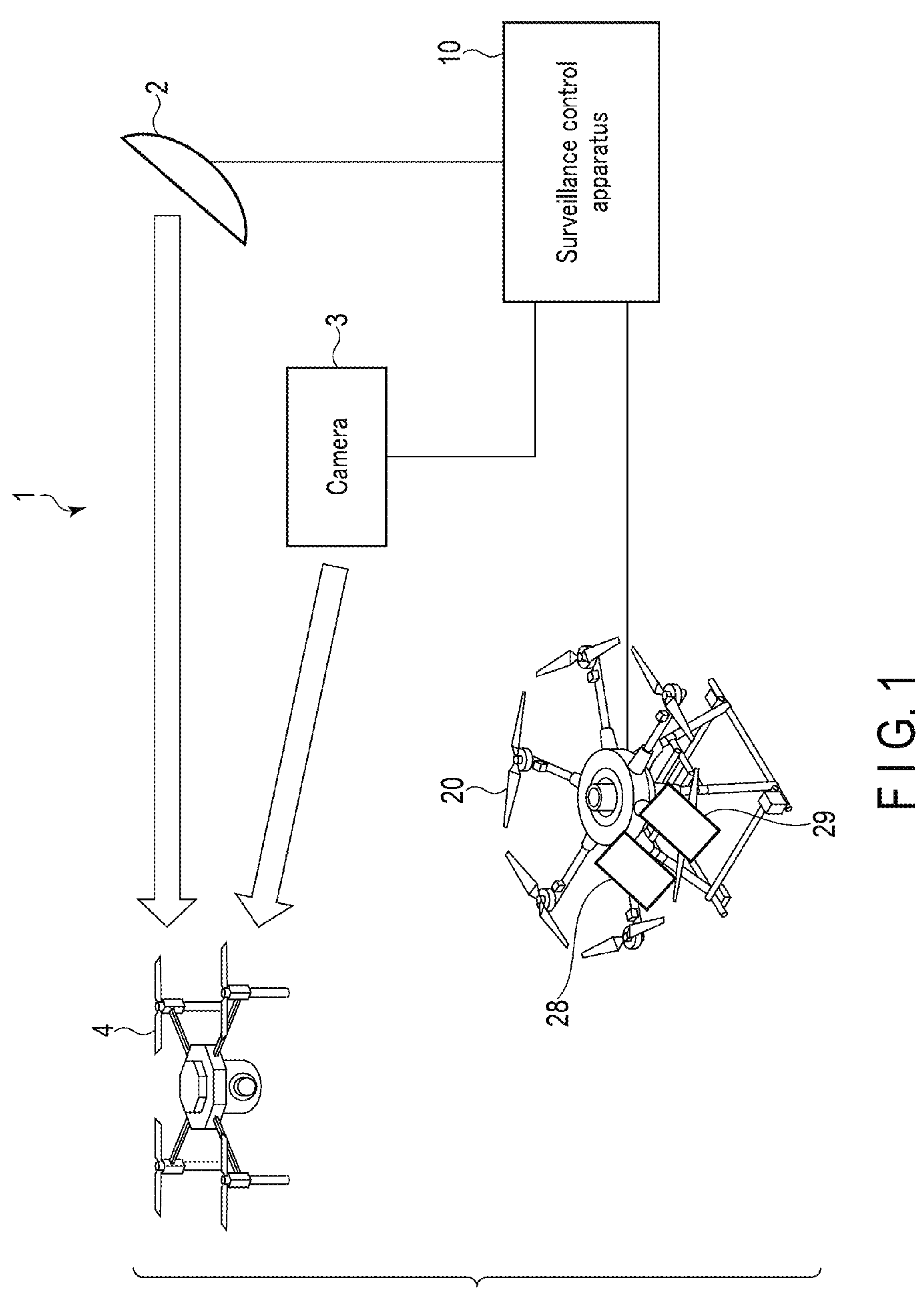
FIG. 1 is a diagram schematically showing a configuration example of a surveillance system according to an embodiment.

FIG. 1 shows a configuration example of a surveillance system 1 according to the embodiment. As shown in FIG. 1, the surveillance system 1 includes a radar 2, a camera 3, a surveillance control apparatus (personal computer) 10, a hunting drone 20, and the like. The surveillance control apparatus 10 is connected to the radar 2, the camera 3, and the hunting drone 20.

As the surveillance system 1, a particular feature may as necessary be added to or deleted from the configuration shown in FIG. 1.

It is assumed herein that the surveillance system 1 captures a target 4. The target 4 is, for example, a suspicious flying object such as an illegal drone.

The radar 2 (detecting mechanism) detects a flying object in a predetermined region including a surveillance region. The radar 27 detects a direction and a distance at which the flying object is present. It is assumed herein that the radar 2 detects the target 4.

The radar 2 is, for example, an example of a detecting mechanism, and is configured of an emitting mechanism configured to emit radio waves of a predetermined frequency and a receiving mechanism configured to detect reflected waves. The radar 2 detects a flying object in a predetermined region based on the reflected waves.

The camera 3 is an example of a detecting mechanism, and photographs a predetermined region (photography region) that overlaps the surveillance region at least partially. The photography region may include a surveillance region, or may be included in the surveillance region. The camera 3 photographs a flying object in the photography region. The flying object may be photographed, for example, with two types of cameras 3, namely, visible-light and infrared cameras.

The hunting drone 20 captures the target 4 under the control of the surveillance control apparatus 10. The hunting drone may also follow flight control by a pilot, and can be flown by the pilot. The hunting drone 20 includes a sound generating mechanism 28, a net gun 29, etc.

The net gun 29 generates a predetermined sound (threatening sound) at the time of firing a net. With the threatening sound, birds (hawks, kites, eagles, crows, doves, etc.) flying around the target 4 can be threatened. The threatening sound deters or repels birds flying around the target 4.

It is assumed herein that the threatening sound is generated by discharging a pressurized gas as a blank with a net gun not loaded with a hunting net. Also, the threatening sound may be used together with a warning sound equipped in the hunting drone. The configuration of the sound generating mechanism 28 is not limited to a particular one.

The net gun 29 is a hunting mechanism configured to capture the target 4. The net gun 29 fires a net for capturing the target 4. The net gun 29 shoots the target 4 with a hunting net by discharging a gas such as a nitrogen gas from a pressurized gas cylinder. The net gun 29 is tied to the net with a string, etc. The net gun 29 can hold the target 4 with the target 4 captured.

The hunting drone 20 will be described in detail later.

The surveillance control apparatus 10 (a host apparatus; an information processing apparatus) detects the target 4 using the radar 2, the camera 3, etc. Upon detecting the target 4, the surveillance control apparatus 10 transmits a hunting instruction to capture the target 4 to the hunting drone 20.

FIG. 2 is a block diagram showing a configuration example of the surveillance control apparatus 10. As shown in FIG. 2, the surveillance control apparatus 10 includes a control unit 11, an operation unit 15, a display unit 16, a radar interface 17, a camera interface 18, a communication interface 19 for communication with the hunting drone, and the like.

The control unit 11, the operation unit 15, the display unit 16, the radar interface 17, the camera interface 18, and the communication interface 19 for communication with the hunting drone are mutually connected via a data bus, etc.

As the surveillance control apparatus 10, a particular feature may be added as necessary to or deleted from the configuration shown in FIG. 2.

The control unit 11 is equipped with a function of controlling the entire operation of the surveillance control apparatus 10.

The operation unit 15 accepts various operation inputs from the operator. The operation unit 15 transmits a signal indicating an input operation to the control unit. The operation unit 15 is configured of, for example, a mouse, a keyboard, a touch panel, or the like.

The display unit 16 displays image data from the control unit 11. The display unit 16 is configured of, for example, a liquid crystal monitor. If the operation unit 15 is configured of a touch panel, the display unit 16 may be formed integrally with the touch panel as the operation unit 15.

The radar interface 17 (detecting mechanism interface) is an interface for transmitting and receiving data to and from the radar 2. The radar interface 17 acquires, from the radar 2, detection results of the radar 2 (e.g., a direction and a distance at which the flying object is present) and supplies them to the control unit 11. The radar interface 17 may be configured to supply power to the radar 2.

The camera interface 18 (detecting mechanism interface) is an interface for transmitting and receiving data to and from the camera 3. The camera interface 18 acquires, from the camera 3, a photography image photographed by the camera 3, and supplies it to the control unit 11. The camera interface 18 may be configured to supply power to the camera 3.

The communication interface 19 for communication with the hunting drone is an interface for transmitting and receiving data to and from the hunting drone 20. The communication interface 19 for communication with the hunting drone wirelessly connects with the hunting drone 20. The communication interface 19 for communication with the hunting drone supplies a hunting instruction from the control unit 11 to the hunting drone 20.

The radar interface 17 and the camera interface 18 may be integrally formed.

Next, a configuration example of the hunting drone 20 will be described.

FIG. 3 shows a configuration example of the hunting drone 20. As shown in FIG. 3, the hunting drone 20 includes a control unit 21, a communication interface 25, a flying mechanism 26, a net gun 29, and the like.

The control unit 21, the communication interface 25, the flying mechanism 26, and the net gun 29 are connected via a data bus or a predetermined interface so as to enable communications thereamong.

As the hunting drone 20, a particular feature may be added as necessary to or deleted from the configuration shown in FIG. 3.

The net gun 29 is as described above.

The communication interface 25 is an interface for transmitting and receiving data to and from the surveillance control apparatus 10, etc. For example, the communication interface 25 supports a wireless local area network (LAN) connection.

The flying mechanism 26 is a mechanism configured to fly the hunting drone 20 under the control of the control unit 21. The flying mechanism 26 causes the hunting drone 20 to hover, rotate, move forward, move backward, ascend, and descend. The flying mechanism 26 is configured of a motor and propellers driven by the motor.

The radar 27 is a sensor for detecting an object in a predetermined region. The radar 27 detects, for example, an obstacle, the target 4, etc. The radar 27 detects a direction and a distance at which an object is present. The radar 27 notifies the control unit 21 of the direction and the distance at which the object is present.

The radar 27 is configured of an emitting mechanism configured to emit radio waves of a predetermined frequency and a receiving mechanism configured to detect reflected radio waves. The radar 27 detects an object in a predetermined region based on the reflected radio waves.

Next, the functions realized by the surveillance control apparatus 10 will be described.

The control unit 11 is equipped with a function of detecting a target 4.

For example, the control unit 11 inputs an operation of starting surveillance for suspicious flying objects through the operation unit 15. Upon inputting the operation, the control unit 11 performs surveillance for suspicious flying objects using the radar 2, the camera 3, etc.

For example, the control unit 11 determines, based on a detection signal from the radar 2, whether or not a suspicious flying object is present in a surveillance region. Also, the control unit 11 determines whether or not a suspicious flying object is present in the surveillance region by analyzing a photography image from the camera 3 in accordance with a predetermined image processing algorithm. The control unit 11 may determine whether or not a suspicious flying object is present in the surveillance region based on both a detection signal from the radar 2 and a photography image from the camera 3.

Upon determining that a suspicious flying object is present, the control unit 11 detects the suspicious flying object as the target 4. For example, the control unit 11 calculates coordinates of the target 4 based on a detection signal from the radar 2, a photography image from the camera 3, and the like.

The control unit 11 is equipped with a function of causing the hunting drone 20 to capture the target 4.

Upon detecting the target 4, the control unit 11 transmits, to the hunting drone 20 via the communication interface 19, a hunting instruction to capture the target 4. The hunting instruction includes coordinates of the target 4.

The control unit 11 keeps detecting the target 4 in the surveillance region even after transmitting a hunting instruction to the hunting drone 20.

The control unit 11 determines whether or not another target 4 is present in the surveillance region if the target 4 goes out of the surveillance region. If it is determined that another target 4 is present, the control unit 11 transmits, to the hunting drone 20, a hunting instruction to capture another target 4.

Upon determining that no other target 4 is present, the control unit 11 may transmit, to the hunting drone 20 via the communication interface 19, a return instruction to return to a predetermined location.

Next, functions realized by the hunting drone 20 will be described. The functions of the hunting drone 20 are realized by the control unit 21 executing programs stored in an internal memory.

The control unit 21 is equipped with a function of causing the hunting drone 20 to approach the target 4 to a predetermined distance.

It is assumed herein that the hunting drone 20 tracks the target 4 by approaching the target 4, and flying or hovering while keeping a predetermined distance. The hunting drone 20 may stand by after landing at a predetermined location.

The control unit 21 receives a hunting instruction from the surveillance control apparatus 10 via the communication interface 25. After receiving the hunting instruction, the control unit 21 causes, using the flying mechanism 26, the hunting drone 20 to approach the target 4. For example, the control unit 21 causes, using the flying mechanism 26, the hunting drone 20 to fly to coordinates of the target 4 based on a hunting instruction.

The control unit 21 is equipped with a function of generating a threatening sound.

After the distance between the hunting drone 20 and the target 4 becomes a predetermined distance, the control unit 21 generates a threatening sound using the net gun 29 or the sound generating mechanism 28. The control unit 21 fires a blank using the net gun 29 or the sound generating mechanism 28. Alternatively, the control unit 21 may fire a hunting net from the net gun 29, and produce a threatening sound.

For example, the control unit 21 moves, using the flying mechanism 26, the hunting drone 20 to a location indicated by a new hunting instruction as a location where the target 4 can be captured. For example, the control unit 21 moves the hunting drone 20 such that the target 4 is covered by a shooting range of the net gun 29.

After the hunting drone 20 is moved, the control unit 21 fires the net gun 29. After capturing the target 4 with a net from the net gun 29, the control unit 21 causes, using the flying mechanism 26, the hunting drone 20 to return to a predetermined location with the target 4 captured.

If the capturing of the target 4 fails, the control unit 21 may cause the hunting drone 20 to return to a predetermined location using the flying mechanism 26.

If a new hunting instruction is not received during the predetermined period, the control unit 21 moves the hunting drone 20 to a location where the current target 4 can be captured, using the flying mechanism 26.

Since an operation example of the control unit 21 capturing the current target 4 is similar to an operation example of capturing a target 4 indicated by a new hunting instruction, a detailed description will be omitted.

Next, an operation example of the surveillance system 1 will be described.

Figure 4:
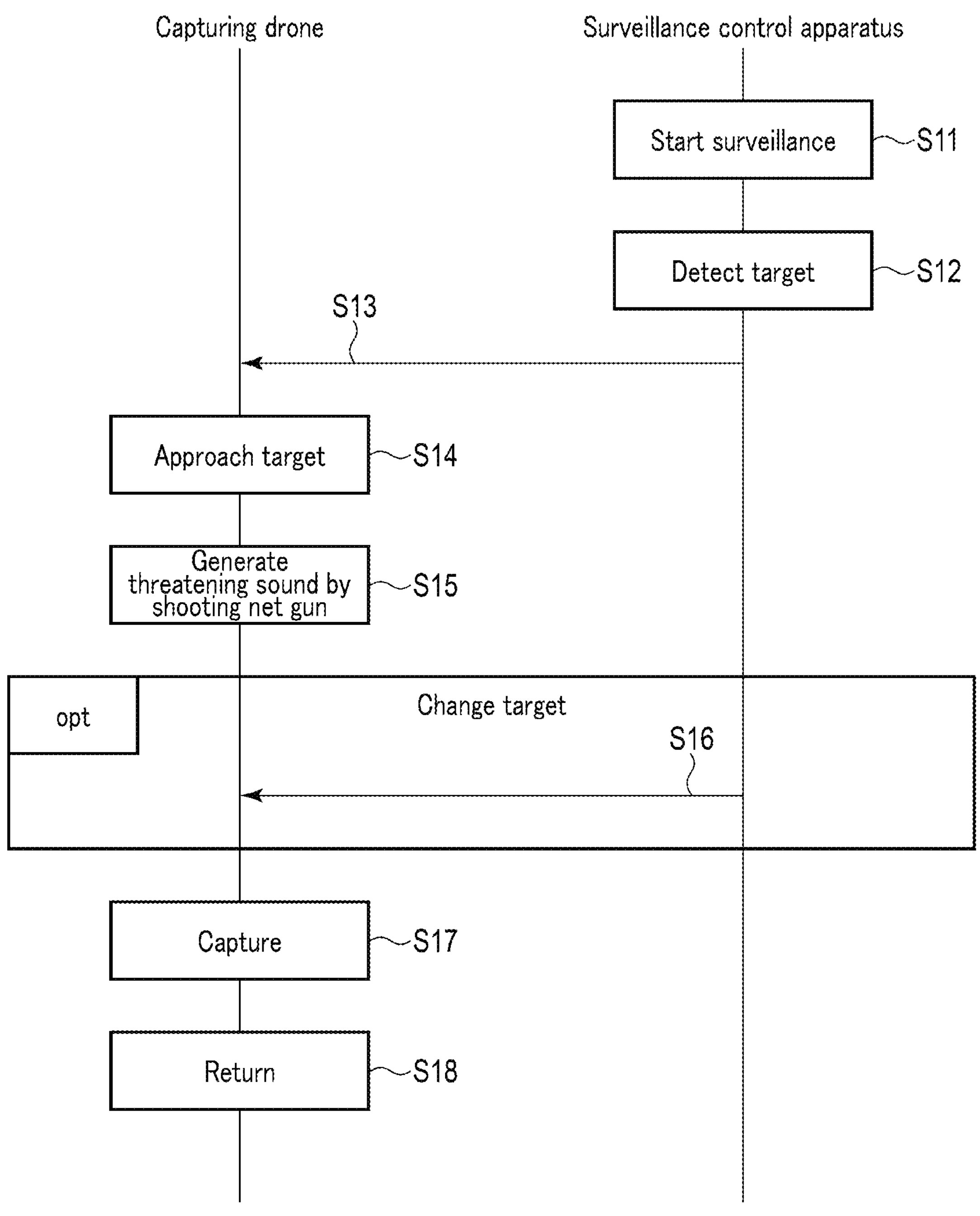
FIG. 4 is a sequence diagram showing an operation example of a surveillance system according to the embodiment.

FIG. 4 is a flowchart illustrating an operation example of the surveillance system 1. It is assumed herein that the hunting drone 20 stands by after landing at a predetermined location.

The control unit 11 of the surveillance control apparatus 10 starts surveillance for suspicious flying objects in a surveillance region using the radar 2 and the camera 3 (S11). It is assumed herein that, after starting surveillance for suspicious flying objects, the control unit 11 detects a suspicious flying object as a target 4 (S12).

Upon detecting the target 4, the control unit 11 transmits, to the hunting drone 20 via the communication interface 19, a hunting instruction to capture the detected target 4 (S13).

The control unit 21 of the hunting drone 20 receives the hunting instruction via the communication interface 25. Upon receiving the hunting instruction, the control unit 21 causes, using the flying mechanism 26, the hunting drone 20 to approach the target 4 indicated by the hunting instruction (S14).

After the distance between the hunting drone 20 and the target 4 becomes a predetermined distance, the control unit 21 generates a threatening sound by discharging a pressurized gas using the net gun 29 (S15), or the surveillance control apparatus 10 generates a threatening sound using the sound generating mechanism 28. The timing when the control unit 21 or the surveillance control apparatus 10 gives an instruction to generate a threatening sound may be the same as the timing at S13, or the same as the timing at S15.

If the control unit 11 of the surveillance control apparatus 10 has detected a bird as the target 4, the bird detected as the target 4 is deterred by the threatening sound. If the bird has been deterred from the surveillance region by the threatening sound, the control unit 11 determines whether or not another target 4 is present in the surveillance region.

It is assumed herein that the control unit 11 has determined that another target 4 is present in the surveillance region. Upon determining that another target 4 is present in the surveillance region, the control unit 11 transmits, to the hunting drone 20 via the communication interface 19, a hunting instruction to capture the target 4 (S16).

The control unit 21 of the hunting drone 20 receives the hunting instruction via the communication interface 25.

The control unit 21 of the hunting drone 20 captures, using the net gun 29, the target 4 based on a hunting instruction transmitted at S13 or S16 (S17). After capturing the target 4, the control unit 21 causes the hunting drone 20 to return to a predetermined location using the flying mechanism 26 (S18).

After the hunting drone 20 has returned, the surveillance system 1 terminates its operation.

Upon determining that no other target 4 is present in the surveillance region, the control unit 11 of the surveillance control apparatus 10 may transmit a return instruction to the hunting drone 20 via the communication interface 19. The control unit 21 of the hunting drone 20 may cause the hunting drone 20 to return to a predetermined location using the flying mechanism 26 in accordance with the return instruction.

The control unit 11 of the surveillance control apparatus 10 may transmit, to the hunting drone 20, an instruction to generate a threatening sound at a timing when the hunting drone 20 has approached the target 4 to a predetermined distance. The control unit 21 of the hunting drone 20 may generate a threatening sound using the net gun 29 or the sound generating mechanism 28 in accordance with the instruction.

After generating the threatening sound, the control unit 11 of the hunting drone 20 may transmit, to the surveillance control apparatus 10 via the communication interface 25, a notification that the threatening sound has been generated.

Moreover, the hunting drone 20 may stand by while flying at a predetermined location.

Furthermore, the hunting drone 20 may include a plurality of net guns 29. In this case, if capturing of the target 4 with a net gun 29 has failed, the hunting drone 20 may fire a net from another net gun 29.

In addition, the hunting drone 20 may be equipped with a hunting mechanism other than the net gun 29. The configuration of the hunting mechanism is not limited to a particular one.

Moreover, the surveillance system 1 may include a plurality of hunting drones 20. Furthermore, the surveillance system 1 may include a drone for detecting a suspicious flying object.

With the above-described configuration, the surveillance system detects a target in a surveillance region. The surveillance system causes a hunting drone to approach the detected target. The surveillance system generates a threatening sound from a net gun 29 or a sound generating mechanism 28 equipped in the hunting drone. This makes it possible for the surveillance system to, upon detecting a bird as a target, deter or repel the bird from the surveillance region. It is thus possible for the surveillance system to, even in the case of falsely recognizing a bird as the target, appropriately change the target.

Even if a target has been appropriately detected by the surveillance system, there may be a case where birds are flying around the target. In such a case, the surveillance system can deter or repel birds flying around the target by means of a threatening sound. This makes it possible for the surveillance system to prevent the birds flying around the target from getting tangled in the net.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A drone, comprising:

a hunting mechanism configured to capture a target;

a flying mechanism configured to fly the drone; and a control unit;

the control unit, the hunting mechanism, and the flying mechanism communicating via a data bus;

wherein the control unit is configured to:

cause the drone to approach the target to a predetermined distance using the flying mechanism;

generate a sound using the hunting mechanism; and capture the target using the hunting mechanism.

2. The drone according to claim 1, further comprising:

a radar configured to measure a distance to the target, wherein the control unit fires a hunting net from a net gun using the hunting mechanism and generates the sound when the distance measured by the radar has become the predetermined distance.

3. The drone according to claim 1, further comprising:

a communication interface for transmitting and receiving data to and from a host apparatus, wherein the control unit is configured to:

communicate with the communication interface via the data bus;

receive, from the host apparatus via the communication interface, a hunting instruction to capture the target; and cause, using the flying mechanism, the drone to approach the target to the predetermined distance in accordance with the hunting instruction.

4. The drone according to claim 1, wherein the hunting mechanism is a net gun configured to fire a net.

5. The drone according to claim 1, wherein the hunting mechanism generates the sound with a blank.

6. An information processing method, the method comprising:

detecting a target;

causing a drone to approach the target to a predetermined distance, the drone including a hunting mechanism configured to capture the target;

generating a sound using the hunting mechanism; and capturing the target using the hunting mechanism.

* * * * *